United States Patent [19]

Morikawa et al.

[11] Patent Number: 5,474,731
[45] Date of Patent: Dec. 12, 1995

[54] PROCESS FOR PRODUCING PHASE RETARDER FILM

[75] Inventors: Michitaka Morikawa, Ibaraki; Koji Higashi, Takatsuki; Tadashi Shindo, Toyonaka, all of Japan

[73] Assignee: Sumitomo Chemical Company, Ltd., Tokyo, Japan

[21] Appl. No.: 226,465

[22] Filed: Apr. 12, 1994

[30] Foreign Application Priority Data

Apr. 12, 1993 [JP] Japan .................................. 5-084439

[51] Int. Cl.⁶ ................................................ B29C 61/02
[52] U.S. Cl. .................... 264/230; 264/1.34; 264/289.6; 264/342 R; 264/DIG. 71
[58] Field of Search .................... 264/342 R, 342 RE, 264/289.6, 288.4, 280, 1.34, 230, DIG. 71; 425/363, 327

[56] References Cited

U.S. PATENT DOCUMENTS

| | | | |
|---|---|---|---|
| 3,290,420 | 12/1966 | Orser | 264/280 |
| 3,445,561 | 5/1969 | Huff et al. | 264/288 |
| 3,577,510 | 5/1971 | Schmitz et al. | 264/342 |
| 3,679,791 | 7/1972 | Reade | 264/342 RE |
| 4,151,245 | 4/1979 | Suzuki | 264/280 |
| 4,160,799 | 7/1979 | Locey et al. | 264/342 R |
| 4,436,888 | 3/1984 | Copple | 264/342 RE |
| 5,042,924 | 8/1991 | Terasaki et al. | 264/1.34 |
| 5,061,042 | 10/1991 | Nakamura et al. | 359/63 |
| 5,069,855 | 12/1991 | Takasu et al. | 264/280 |
| 5,235,450 | 8/1993 | Yoshimura et al. | 359/63 |
| 5,244,713 | 9/1993 | Nakamura et al. | 428/156 |
| 5,285,303 | 2/1994 | Okada et al. | 359/73 |
| 5,311,340 | 5/1994 | Thurata et al. | 359/73 |

FOREIGN PATENT DOCUMENTS

| | | | |
|---|---|---|---|
| 0458635 | 11/1991 | European Pat. Off. . | |
| 0482620 | 4/1992 | European Pat. Off. | G02B 5/30 |
| 0546748 | 6/1993 | European Pat. Off. . | |
| 0587890 | 3/1994 | European Pat. Off. . | |
| 61-167531 | 7/1986 | Japan | B29C 55/12 |
| 289006 | 3/1990 | Japan | G02B 5/30 |
| 2160204 | 6/1990 | Japan | G02B 5/30 |
| 2191904 | 7/1990 | Japan | G02B 5/30 |
| 2285303 | 11/1990 | Japan | G02B 5/30 |
| 9222002 | 12/1992 | WIPO . | |

OTHER PUBLICATIONS

EP 92310928 European Search Report citing Japanese Patent Kokai Laid–Open 2-089006.
Patent Abstracts of Japan, vol. 16, No. 17 (P–1299), Jan. 16, 1992.
Patent Abstracts of Japan, vol. 13, No. 296 (M–846), Jul. 10, 1989.

*Primary Examiner*—Jeffery R. Thurlow
*Attorney, Agent, or Firm*—Sughrue, Mion, Zinn, Macpeak & Seas

[57] ABSTRACT

A process for continuously producing a phase retarder film or sheet comprising continuously supplying a stretched thermoplastic resin film or sheet to a heating zone in parallel with the stretching direction of the film or sheet and heating the film or sheet to a temperature not lower than the glass transition temperature of the resin while applying pressure to the surface of the film or sheet passing through the heating zone, thereby continuously subjecting the film or sheet to thermal relaxation while suppressing the expansion of the film or sheet in a direction parallel to the surface of the film or sheet and perpendicular to the stretching axis. According to the present invention, a phase retarder film or sheet having a low angular dependence of retardation can be produced continuously. By using the phase retarder film(s) or sheet(s) thus obtained as optical compensator(s), the viewing angle characteristics of liquid crystal display devices can remarkably be improved.

2 Claims, 4 Drawing Sheets

PROCESS FOR PRODUCING PHASE RETARDER FILM

BACKGROUND OF THE INVENTION

1. Field of the Invention

The present invention relates to a process for continuously producing a phase retarder film or sheet used in liquid crystal display devices, etc.

2. Description of the Related Art

Phase retarder films or sheets each comprising a uniaxially oriented thermoplastic resin film or sheet have been used as optical compensators to enhance display qualities of liquid crystal display devices.

A STN type liquid crystal display device using such phase retarder film(s) or sheet(s) as optical compensator(s) is advantageous in that it is lighter in weight, thinner and less expensive, but disadvantageous in that it has a narrow viewing angle characteristic and exhibits a low contrast ratio as compared with a STN double cell type liquid crystal display device using a liquid crystal cell as optical compensator.

These disadvantages have been considerably eliminated by, for example, laminating two plies of phase retarder films or sheets, but the viewing angle characteristic has not reached a satisfactory level.

The viewing angle characteristic of a liquid crystal display device using phase retarders as optical compensators greatly depends not only upon the angular dependence of the birefringence of the liquid crystal cell used therein but also upon the angular dependence of the retardation of the phase retarder. In conventional phase retarders, it is known that lower angular dependence of retardation gives a superior result.

The angular dependence of retardation of a phase retarder film or sheet is expressed by a retardation ratio $R_{40}/R_0$. In this case, the retardation $R_{40}$ is a value measured with the phase retarder film or sheet being tilted by 40° from the horizontal condition by rotating around an axis which corresponds to the slow axis if the phase retarder consists of a thermoplastic resin having a positive intrinsic birefringence, or to the fast axis if the phase retarder consists of a thermoplastic resin having a negative intrinsic birefringence; the retardation $R_0$ is a value measured with the phase retarder film or sheet not being tilted (i.e. arranged horizontally); and the measurement is made using a polarizing microscope equipped with a Sénarmont compensator. As the retardation ratio of a phase retarder is closer to 1, its angular dependence of retardation is lower.

In order to make low the angular dependence of retardation of a phase retarder film or sheet, there were proposed, for example, the following methods.

A method of shrinking a film in a direction perpendicular to the stretching axis at the time of the uniaxial stretching [Japanese Patent Kokai (Laid-open) No. 2-191904].

A method of stretching a film whose molecules are orientated in a direction normal to the film surface [Japanese Patent Kokai (Laid-open) No. 2-160204].

A method of stretching a film produced from a molten polymer or a polymer solution under an electric field applied [Japanese Patent Kokai (Laid-open) No. 2-285303]. None of these methods, however, is sufficient in improvement of the angular dependence and application to mass production.

The present inventors have made an extensive study in order to solve the above problems. As a result, the present inventors have found that a phase retarder film or sheet having a low angular dependence of retardation can be continuously produced by the continuous thermal relaxation of a stretched thermoplastic resin film or sheet by continuously supplying the film or sheet to a heating zone in parallel with the stretching direction of the film or sheet and heating the film or sheet to a temperature not lower than the glass transition temperature of the resin while applying pressure to the surface of the film or sheet passing through the heating zone. The present inventors thus completed the present invention.

SUMMARY OF THE INVENTION

The present invention relates to a process for continuously producing a phase retarder film or sheet comprising continuously supplying a stretched thermoplastic resin film or sheet to a heating zone in parallel with the stretching direction of the film or sheet and heating the film or sheet to a temperature not lower than the glass transition temperature of the resin while applying pressure to the surface of the film or sheet passing through the heating zone, thereby continuously subjecting the film or sheet to thermal relaxation while suppressing the expansion of the film or sheet in the direction parallel to the surface of the film or sheet and perpendicular to the stretching axis.

An object of the present invention is to provide a process for continuously producing a phase retarder film or sheet having a low angular dependence of retardation.

Another object of the present invention is to obtain a liquid crystal display device using the above phase retarder film(s) or sheet(s) as optical compensator(s) and having a remarkably improved viewing angle characteristic.

Other objects and advantages of the present invention will become apparent from the following description and accompanying drawings.

PREFERRED EMBODIMENTS OF THE INVENTION

Figure 1:
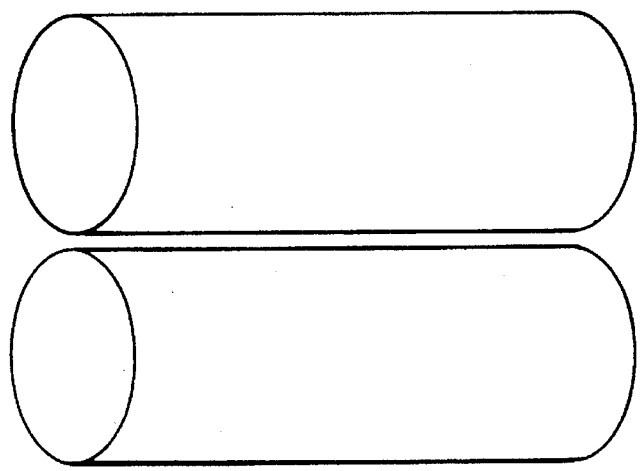
FIG. 1 is a schematic view of a pair of heat rolls.

A stretched thermoplastic resin film or sheet shrinks in the stretching direction when it is subjected to thermal relaxation in an unrestricted condition at a temperature not lower than the glass transition temperature of the thermoplastic resin. During this thermal relaxation, the film or sheet tends to expand in a direction parallel to the film or sheet surface and perpendicular to the stretching axis, because the film or sheet has a neck-in (shrinkage) generated during the stretching, in the direction parallel to the film or sheet surface and perpendicular to the stretching axis.

When a stretched film or sheet is subjected to thermal relaxation while suppressing its expansion in a direction parallel to the film or sheet surface and perpendicular to the stretching axis, to a length smaller than that obtained in an unrestricted condition, the length in the stretching axis direction shrinks and thickness of the film or sheet expands and exhibits improved angular dependence of retardation.

Herein, the stretching axis refers to an axis of uniaxial stretching in the case of uniaxial stretching, and to an axis of main stretching in the case of unbalanced biaxial stretching.

"Direction parallel to the surface of the film or sheet and perpendicular to the stretching axis" refers to a direction parallel to the surface and of 60°–120° to stretching axis. Suppression of expansion in a direction of, in particular, 85°–95° to stretching axis is preferable in view of the improvement in angular dependence of retardation. Suppression of expansion in a direction parallel to the film or sheet surface and perpendicular to the stretching axis, as compared with the suppression in other directions, gives higher improvement in angular dependence of retardation.

"Suppression of expansion in a direction parallel to the film or sheet surface and perpendicular to the stretching axis" refers to keeping the expansion in said direction substantially at 0, i.e. keeping constant the length of the film or sheet in said direction and further making the expansion in said direction smaller than the level obtained when the film or sheet is subjected to thermal relaxation in an unrestricted condition until a desired $R_0$ value is attained.

There is no particular limitation to the method of continuously supplying the stretched thermoplastic resin film or sheet to a heating zone in parallel to the stretching direction, and heating the film or sheet to a temperature not lower than the glass transition temperature of the resin while applying pressure to the surface of the film or sheet, as far as the method does not make wrinkles in the film or sheet nor reduce the thickness of the film or sheet below that before the thermal relaxation.

Such the method includes a method with a heating device provided with a mechanism described below, for example, a pair of such the heating devices. The mechanism is such that it has a space into which the film or sheet can be inserted, or produces a space necessary for the passage of the film or sheet by insertion thereof, in which space the passing film or sheet can be heated to a temperature not lower than the glass transition temperature of the resin while applying pressure to its surface.

Such a pair of heating devices include paired heating devices which are arranged opposite to each other with a space therebetween which barely permits the insertion and passage of the film or sheet, and paired heating devices which are arranged opposite to each other and provided with a mechanism producing a space necessary for the passage of the film or sheet when the film or sheet is inserted. Further, these paired heating devices must have a mechanism which can give heat and apply pressure to the surface of the film or sheet passing through the space.

Figure 2:
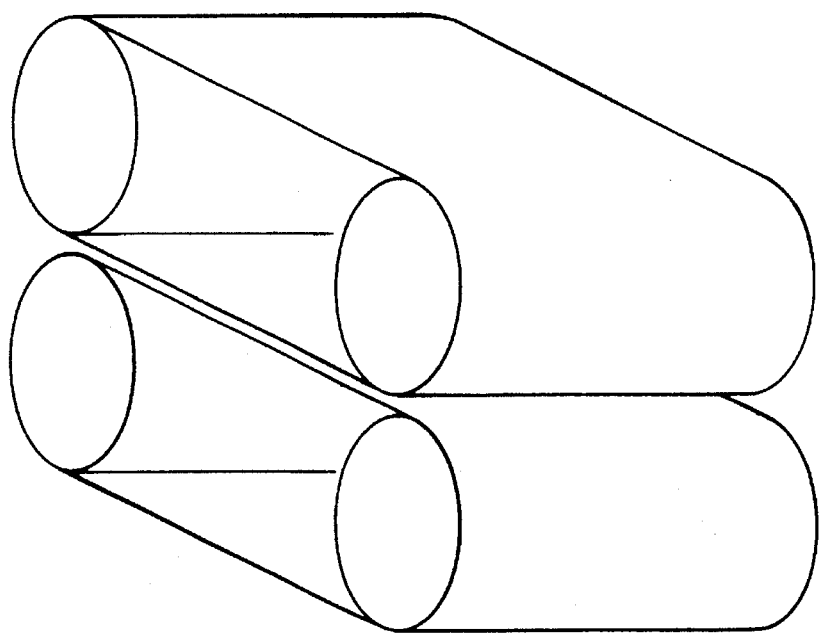
FIG. 2 is a schematic view of a pair of heat belts.
Figure 3:
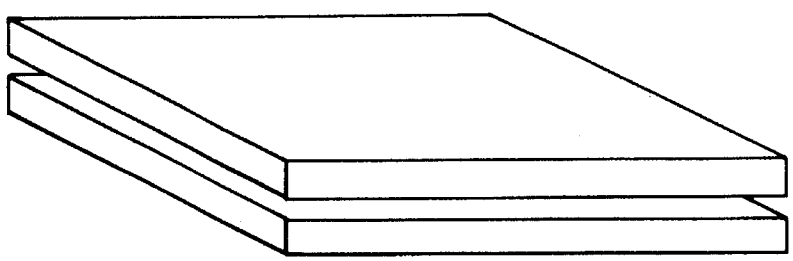
FIG. 3 is a schematic view of a pair of heat plates.
Figure 4:
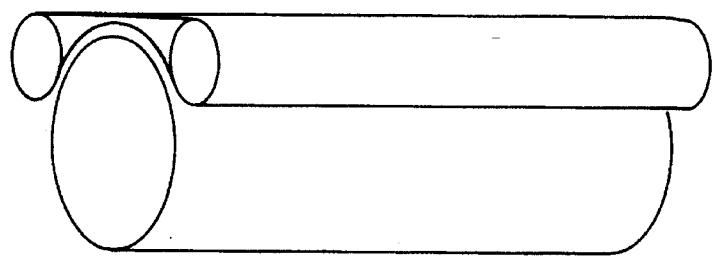
FIG. 4 is a schematic view of the combination of a heat roll with a heat belt.
Figure 5:
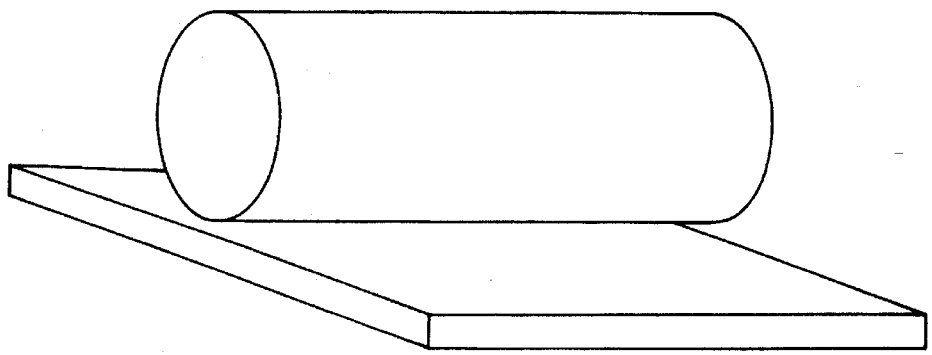
FIG. 5 is a schematic view of the combination of a heat roll with a heat plate.
Figure 6:
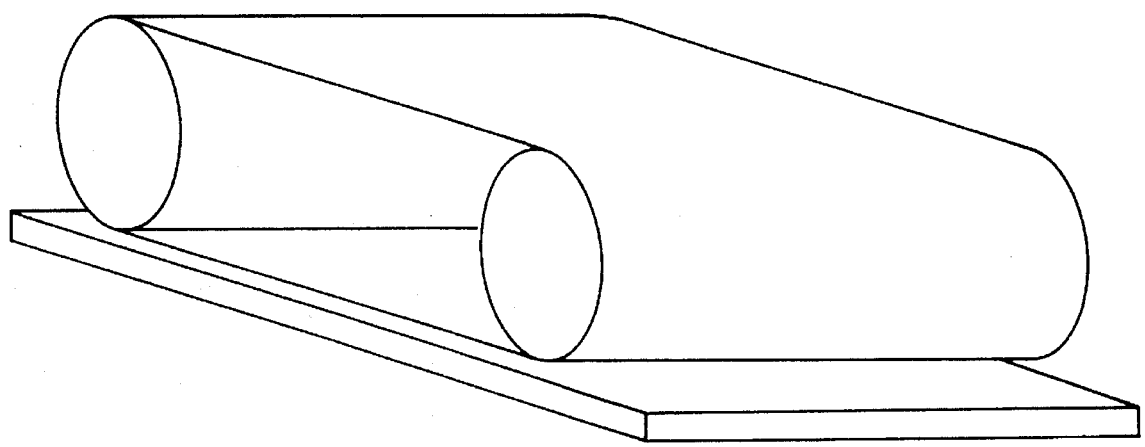
FIG. 6 is a schematic view of the combination of a heat belt with a heat plate.

The above heating devices are not critical, as far as they are provided with a mechanism which can heat the film or sheet to a temperature not lower than the glass transition temperature of the resin while applying pressure to the surface of the film or sheet. Specifically, there are given those shown in FIGS. 1 to 6 having a mechanism which can apply pressure to the surface of the film or sheet. FIG. 1 shows a pair of heat rolls, FIG. 2 shows a pair of heat belts, FIG. 3 shows a pair of heat plates, FIG. 4 shows the combination of a heat roll with a heat belt, FIG. 5 shows the combination of a heat roll with a heat plate, and FIG. 6 shows the combination of a heat belt with a heat plate.

When the film or sheet is continuously passed between a pair of heating devices in contact therewith, a frictional force is generated by contact of the film or sheet surface with the devices during the passage. As a result, expansion of the film or sheet in the direction parallel to the film or sheet surface and perpendicular to the stretching axis is suppressed.

Figure 7:
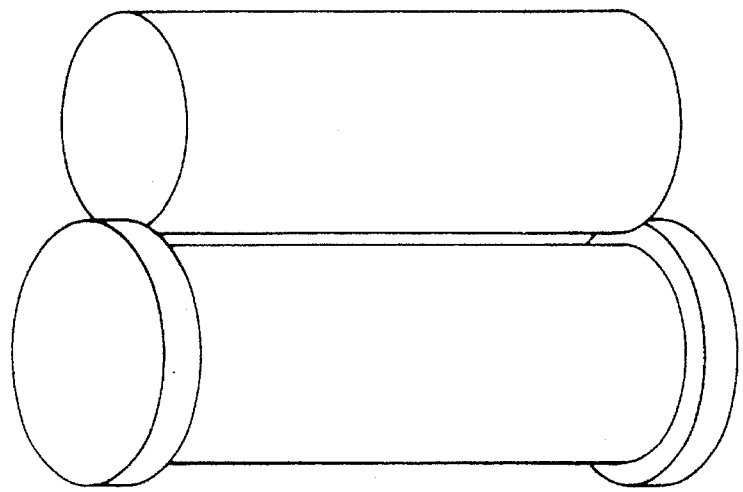
FIG. 7 is a schematic view of a pair of heat rolls one of which has a groove cut in parallel with a film surface or a sheet surface.
Figure 8:
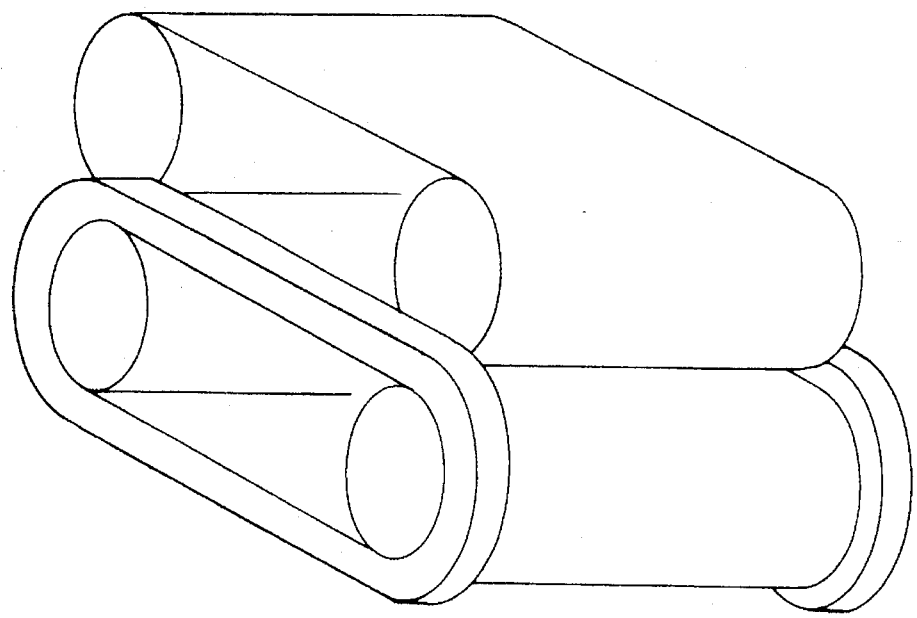
FIG. 8 is a schematic view of a pair of heat belts one of which has a groove cut in parallel with a film surface or a sheet surface.
Figure 9:
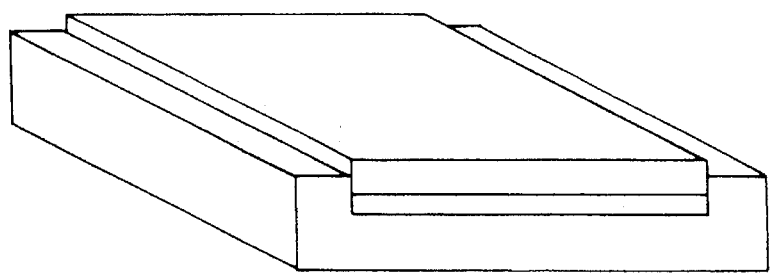
FIG. 9 is a schematic view of a pair of heat plates one of which has a groove cut in parallel with a film surface or a sheet surface.
Figure 10:
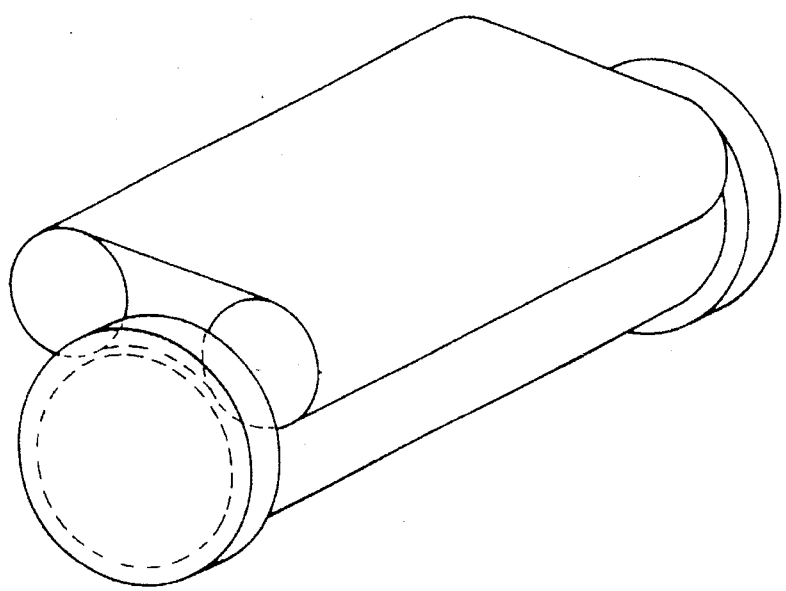
FIG. 10 is a schematic view of the combination of a heat roll having a groove cut in parallel with a film surface or a sheet surface with a heat belt.
Figure 11:
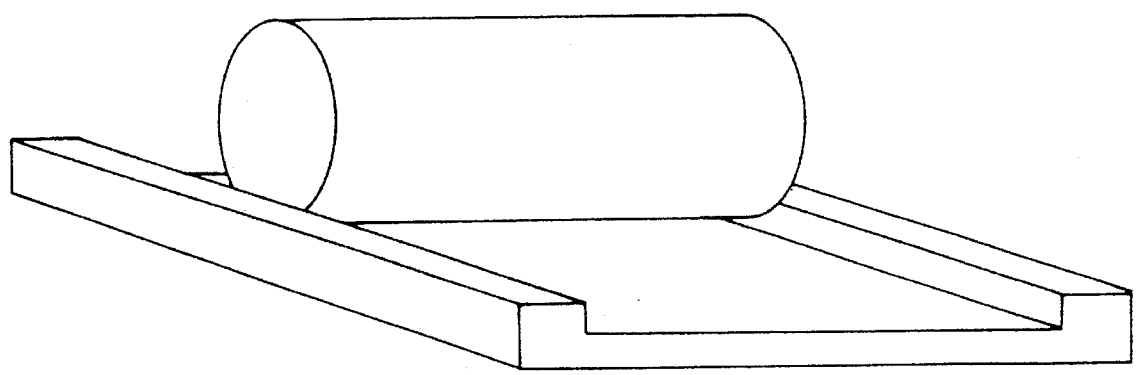
FIG. 11 is a schematic view of the combination of a heat roll and a heat plate having a groove cut in parallel with a film surface or sheet surface.
Figure 12:
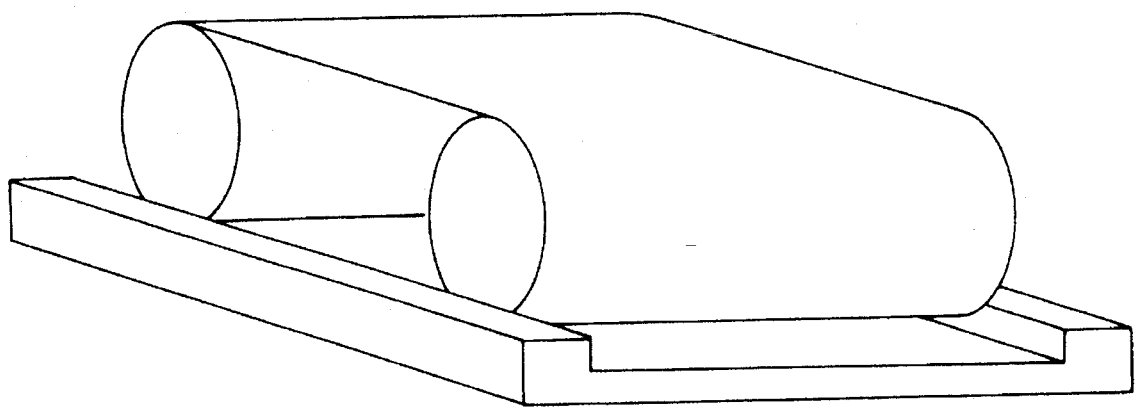
FIG. 12 is a schematic view of the combination of a heat plate having a groove cut in parallel with a film surface.

In addition to the above, there are given pairs of heating devices shown in FIGS. 7 to 12 which are provided with a mechanism which can apply pressure to the film or sheet surface and one of which has a groove cut in parallel with the film or sheet surface. FIG. 7 shows a pair of heat rolls, FIG. 8 shows a pair of heat belts, FIG. 9 shows a pair of heat plates, FIG. 10 shows the combination of a heat roll with a heat belt, FIG. 11 shows the combination of a heat roll with a heat plate, and FIG. 12 shows the combination of a heat belt with a heat plate.

When the film or sheet is continuously passed in a groove cut in the heating device, a frictional force is generated by contact of the film or sheet surface with the devices during the passage, and further expansion of the film or sheet in the direction parallel to the film or sheet surface and perpendicular to the stretching axis is suppressed by the both side walls of the groove. For this reason, the expansion of the film or sheet in said direction is suppressed.

In practicing the present invention, pairs of heating device shown in FIGS. 1 to 12 may be used, if necessary, in combination of the plural number of them.

Thus, by subjecting the film or sheet to thermal relaxation while suppressing the expansion in the direction parallel to the film or sheet surface and perpendicular to the stretching axis, the rate, $V_2$, of the film or sheet after passage through the heating zone can be made smaller than the rate, $V_1$, of the film or sheet supplied to the heating zone. As a result, a phase retarder film or sheet having a low angular dependence of retardation and satisfying the following equation can be produced continuously:

$$0.900 < (R_{40}/R_0)_2 < (R_{40}/R_0)_1$$

wherein $(R_{40}/R_0)_1$ is $R_{40}/R_0$ of film or sheet before thermal relaxation and $(R_{40}/R_0)_2$ is $R_{40}/R_0$ of film or sheet after thermal relaxation.

When continuous thermal relaxation of the stretched thermoplastic resin film or sheet is carried out while suppressing the expansion in the direction parallel to the film or sheet surface and perpendicular to the stretching axis, it is desirable to adjust the pressure so as not to make wrinkles in the film or sheet. Considering the uniformity of the film or sheet after thermal relaxation and the relaxation rate, the pressure to be applied to the film or sheet surface is in the range of, for example, from 0.1 g/cm² to 10 kg/cm².

The stretched thermoplastic resin film or sheet may be any of those having a property to shrink in the direction of the stretching axis during thermal relaxation in the heating zone and to expand in the direction parallel to the film or sheet surface and perpendicular to the stretching axis.

A method for producing such the film or sheet is not critical. For example, there is given a method of producing an unstretched film or sheet by the known film-forming techniques such as solution casting, press molding, extrusion molding and the like, and then stretching this unstretched film or sheet by the known stretching methods such as tentering, stretching between rolls, rolling (i.e. compressive stretching between rolls) and the like.

Examples of the stretched thermoplastic resin film or sheet include a film or sheet longitudinally uniaxial-stretched in the lengthwise direction produced by the above method. In view of the orientation of molecules in the direction of thickness during thermal relaxation and uniformity of in-plane retardation of the film or sheet, a desirable film or sheet is one produced by making a film or sheet by solution casting and subjecting the resulting film or sheet to longitudinal uniaxial stretching between rolls.

As to the temperature at which the stretched thermoplastic resin film or sheet is relaxed thermally, any temperature will do if it is not lower than the glass transition temperature ($T_g$) of the thermoplastic resin and lower than the melting point ($T_m$) and enables the thermal relaxation of the thermoplastic resin film or sheet.

The temperature of thermal relaxation varies depending upon the $T_g$ and $T_m$ of the resin used, but is preferably in the range of $T_g$ to ($T_g$+50° C.) in view of the control of in-plane retardation of the film or sheet and orientation of molecules in the direction of thickness.

It is sufficient for the film or sheet to be heated above the glass transition temperature of the resin. Therefore, it doesn't matter if there is a difference in temperature between a pair of heating devices, and also, if the temperature of one of the heating devices is lower than the glass transition temperature of the resin, there is no problem if the temperature of the film or sheet is not lower than the glass transition temperature.

It is desirable to apply a cushioning medium to at least one side of the stretched thermoplastic resin film or sheet because temperature and pressure are transferred to the film or sheet surface through the cushioning medium to reduce unevenness in temperature, pressure and the like during thermal relaxation.

It is desirable to interpose the stretched thermoplastic resin film or sheet between release agents (e.g. releasable polyester films) or to coat the surface of the film or sheet with a lubricant (e.g. silicone oil, molten surfactant) because the transformation rate increases and uniformity in the transformation rate improves during thermal relaxation.

The thermoplastic resin is not critical as long as it has an intrinsic birefringence, but those which are superior in optical characteristics (e.g. transparency, etc.) are desirable.

The thermoplastic resins having a positive intrinsic birefringence include polycarbonate, polysulfone, polyarylate, polyethersulfone, cellulose diacetate and the like.

The thermoplastic resins having a negative intrinsic birefringence include polystyrene, α-methylpolystyrene, polyvinylpyridine, polyvinylnaphthalene, polymethyl methacrylate and the like.

Particularly, polycarbonate is preferred in terms of transparency, heat and humidity resistance, expression of birefringence and the like.

The present invention will be illustrated in detail with reference to the following examples, but it is not to be interpreted as being limited thereto.

EXAMPLE 1

A polycarbonate film obtained by solvent casting was stretched in the lengthwise direction by longitudinal uniaxial stretching to obtain a stretched film of width=34.8 cm (direction perpendicular to stretching axis), thickness=138 µm, $R_0$=619 nm and $R_{40}/R_0$=1.112.

This stretched film was interposed between two same releasable films (Cerapeel Q-1 #188 produced by Toyo Metallizing Co., Ltd.), and a silicone oil (KF-96-20CS produced by Shin-Etsu Chemical Co., Ltd.) was injected between the releasable films and stretched film.

The resulting sandwich, together with a flannel having a thickness of 1500 µm under no load as a cushioning medium, was passed between a pair of rotating hot rolls (diameters of both the upper and lower rolls, 20 cm; surface temperatures of both the rolls, 160° C.; and distance between rolls, 820 µm), with the cushioning medium below the sandwich. In this case, the sandwich was passed at a rate of 6 cm/min with its advance direction parallel to the direction of stretching axis of the stretched film. In this way, continuous thermal relaxation was carried out while suppressing the expansion of the film in the direction perpendicular to stretching axis.

As a result, there was obtained a phase retarder film of width=34.9 cm, thickness=153 µm, $R_0$=406 nm and $R_{40}/R_0$=1.004, having a low angular dependence of retardation.

EXAMPLE 2

The same stretched film as used in Example 1 was cut into a width of 20.0 cm. This stretched film was interposed between two same releasable films (Cerapeel Q-1 #188 produced by Toyo Metallizing Co., Ltd.), and a silicone oil (KF-96-20CS produced by Shin-Etsu Chemical Co., Ltd.) was injected between the releasable films and stretched film.

The resulting sandwich, together with a flannel having a thickness of 1500 µm under no load as a cushioning medium, was passed between a pair of rotating hot rolls (diameters of both the upper and lower rolls, 20 cm; surface temperatures of both the rolls, 170° C., and distance between rolls, 800 µm), with the cushioning medium below the sandwich. In this case, the sandwich was passed at a rate of 6 cm/min with its advance direction parallel to the direction of stretching axis of the stretched film. In this way, continuous thermal relaxation was carried out while suppressing the expansion of the film in the direction perpendicular to stretching axis.

As a result, there was obtained a phase retarder film of width=20.05 cm, thickness=155 µm, $R_0$=366 nm and $R_{40}/R_0$=1.058, having a low angular dependence of retardation.

EXAMPLE 3

A polycarbonate film obtained by solvent casting was stretched in the lengthwise direction by longitudinal uniaxial stretching to obtain a stretched film of width=20.0 cm (direction perpendicular to stretching axis), thickness=153 µm, $R_0$=935 nm and $R_{40}/R_0$=1.155.

This stretched film was interposed between two same releasable films (Cerapeel Q-1 #188 produced by Toyo Metallizing Co., Ltd.), and a silicone oil (KF-96-20CS produced by Shin-Etsu Chemical Co., Ltd.) was injected between the releasable films and stretched film.

The resulting sandwich, together with a flannel having a thickness of 1500 μm under no load as a cushioning medium, was passed between a pair of rotating hot rolls (diameters of both the upper and lower rolls, 20 cm; surface temperatures of both the rolls, 160° C.; and distance between rolls, 920 μm), with the cushioning medium below the sandwich. In this case, the sandwich was passed at a rate of 6 cm/min with its advance direction parallel to the direction of stretching axis of the stretched film. In this way, continuous thermal relaxation was carried out while suppressing the expansion of the film in the direction perpendicular to stretching axis.

As a result, there was obtained a phase retarder film of width=20.05 cm, thickness=172 μm, $R_0$=433 nm and $R_{40}/R_0$=1.000, having a low angular dependence of retardation.

EXAMPLE 4

A polycarbonate film obtained by solvent casting was stretched in the lengthwise direction by longitudinal uniaxial stretching to obtain a stretched film of width=20.0 cm (direction perpendicular to stretching axis), thickness=157 μm, $R_0$=1232 nm and $R_{40}/R_0$=1.144.

This stretched film was interposed between two same releasable films (Cerapeel Q-1 #188 produced by Toyo Metallizing Co., Ltd.), and a silicone oil (KF-96-20CS produced by Shin-Etsu Chemical Co., Ltd.) was injected between the releasable films and stretched film.

The resulting sandwich, together with a flannel having a thickness of 1500 μm under no load as a cushioning medium, was passed between a pair of rotating hot rolls (diameters of both the upper and lower rolls, 20 cm; surface temperatures of both the rolls, 160° C.; and distance between rolls, 920 μm), with the cushioning medium below the sandwich. In this case, the sandwich was passed at a rate of 6 cm/min with its advance direction parallel to the direction of stretching axis of the stretched film. In this way, continuous thermal relaxation was carried out while suppressing the expansion of the film in the direction perpendicular to stretching axis.

As a result, there was obtained a phase retarder film of width=20.1 cm, thickness=186 μm, $R_0$=628 nm and $R_{40}/R_0$=0.973, having a low angular dependence of retardation.

EXAMPLE 5

The same stretched film as used in Example 1 was cut into a width of 20 cm. This stretched film was interposed between two same releasable films (Cerapeel Q-1 #188 produced by Toyo Metallizing Co., Ltd.), and a silicone oil (KF-96-20CS produced by Shin-Etsu Chemical Co., Ltd.) was injected between the releasable films and stretched film.

The resulting sandwich, together with a flannel having a thickness of 1500 μm under no load as a cushioning medium, was passed between a pair of rotating hot rolls (diameters of both the upper and lower rolls, 20 cm; surface temperatures of both the rolls, 160° C.; and distance between rolls, 700 μm), with the cushioning medium below the sandwich. In this case, the sandwich was passed at a rate of 6 cm/min with its advance direction parallel to the direction of stretching axis of the stretched film. In this way, continuous thermal relaxation was carried out while suppressing the expansion of the film in the direction perpendicular to stretching axis.

As a result, there was obtained a phase retarder film of width=20.1 cm, thickness=147 μm, $R_0$= 459 nm and $R_{40}/R_0$=1.043, having a low angular dependence of retardation.

EXAMPLE 6

The same stretched film as used in Example 1 was interposed between two same releasable films (Cerapeel Q-1 #188 produced by Toyo Metallizing Co., Ltd.). The resulting sandwich, together with a flannel having a thickness of 1500 μm under no load as a cushioning medium, was passed between a pair of rotating hot rolls (diameters of both the upper and lower rolls, 20 cm; surface temperatures of both the rolls, 160° C.; and distance between rolls, 800 μm), with the cushioning medium below the sandwich. In this case, the sandwich was passed at a rate of 6 cm/min with its advance direction parallel to the direction of stretching axis of the stretched film. In this way, continuous thermal relaxation was carried out while suppressing the expansion of the film in the direction perpendicular to stretching axis.

As a result, there was obtained a phase retarder film of width=34.9 cm, thickness=149 μm, $R_0$=409 nm and $R_{40}/R_0$=1.000, having a low angular dependence of retardation.

EXAMPLE 7

The same stretched film as used in Example 1 was cut into a width of 20 cm. This stretched film was interposed between two same releasable films (Cerapeel Q-1 #188 produced by Toyo Metallizing Co., Ltd.) and passed between a pair of rotating hot rolls (diameters of both the upper and lower rolls, 20 cm; surface temperatures of both the rolls, 160° C.; and distance between rolls, 500 μm) at a rate of 6 cm/min with its advance direction parallel to the direction of stretching axis of the stretched polycarbonate film. In this way, continuous thermal relaxation was carried out while suppressing the expansion of the film in the direction perpendicular to stretching axis.

As a result, there was obtained a phase retarder film of width=20.15 cm, thickness=147 μm, $R_0$=206 nm and $R_{40}/R_0$=1.037, having a low angular dependence of retardation.

Comparative Example 1

The same stretched film as used in Example 1 was cut into a size of 10 cm in length (direction perpendicular to stretching axis)×10 cm in width (stretching axis direction). This film was thermally relaxed for 4 minutes on a releasable film (Cerapeel Q-1 #188 produced by Toyo Metallizing Co., Ltd.) under a temperature condition of 158° C.

As a result, this polycarbonate film changed to a size of 10.1 cm in length×9.65 cm in width. The thickness, $R_0$ and $R_{40}/R_0$ of this film were 141 μm, 415 nm and 1.118, respectively.

What is claimed is:

1. A process for continuously producing a phase retarder film or sheet comprising continuously supplying a stretched thermoplastic resin film or sheet which is longitudinally uniaxially-stretched in the lengthwise direction of the film or sheet or subjected to unbalanced biaxial stretching with a main stretching axis in the lengthwise direction of the film or sheet, to a heating zone in parallel with the stretching direction of the film or sheet and heating the film or sheet to a temperature not lower than the glass transition temperature of the resin while applying pressure to the surface of the film or sheet passing through the heating zone, thereby continuously subjecting the film or sheet to thermal relaxation while suppressing the expansion of the film or sheet in a direction parallel to the surface of the film or sheet and perpendicular to the stretching axis.

2. A process according to claim 1, wherein the heating zone is a pair of heat rolls.

* * * * *